Dec. 8, 1942. J. P. MINTON 2,304,740
METHOD FOR RECORDING SEISMIC WAVES
Filed March 6, 1940 2 Sheets-Sheet 1
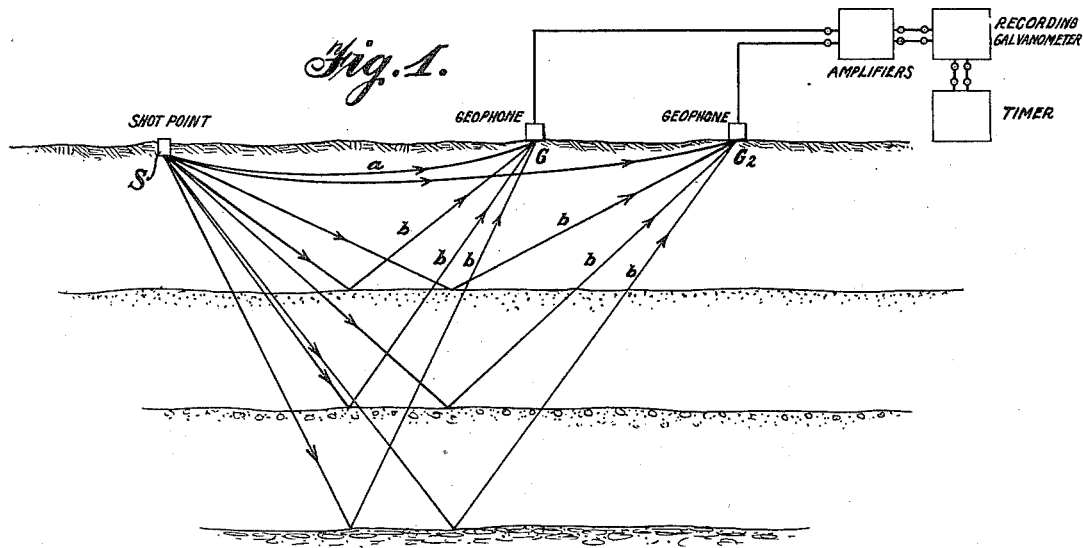
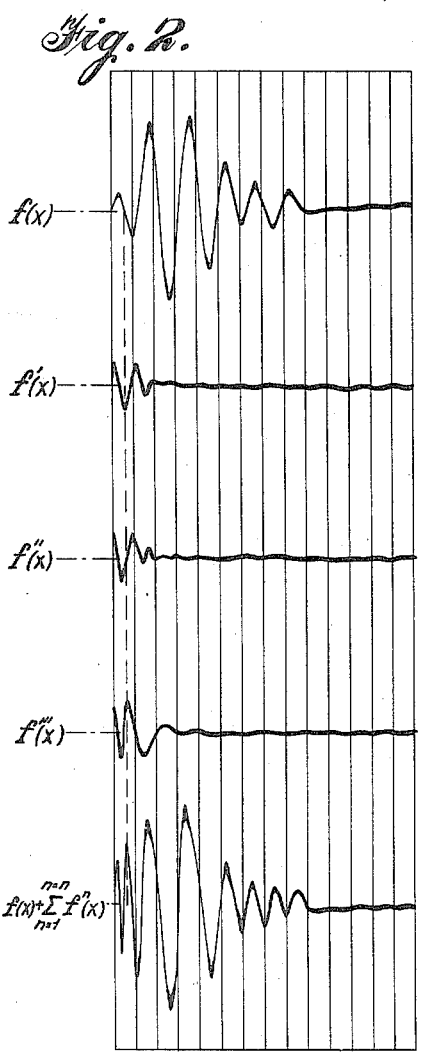
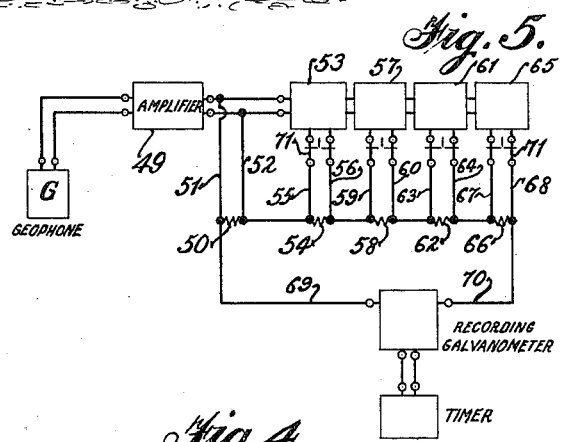
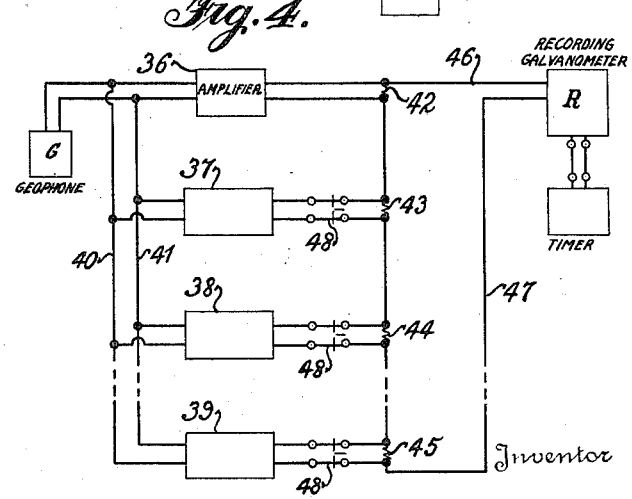
Inventor
John P. Minton
By Myron J. Burkhead
Attorney

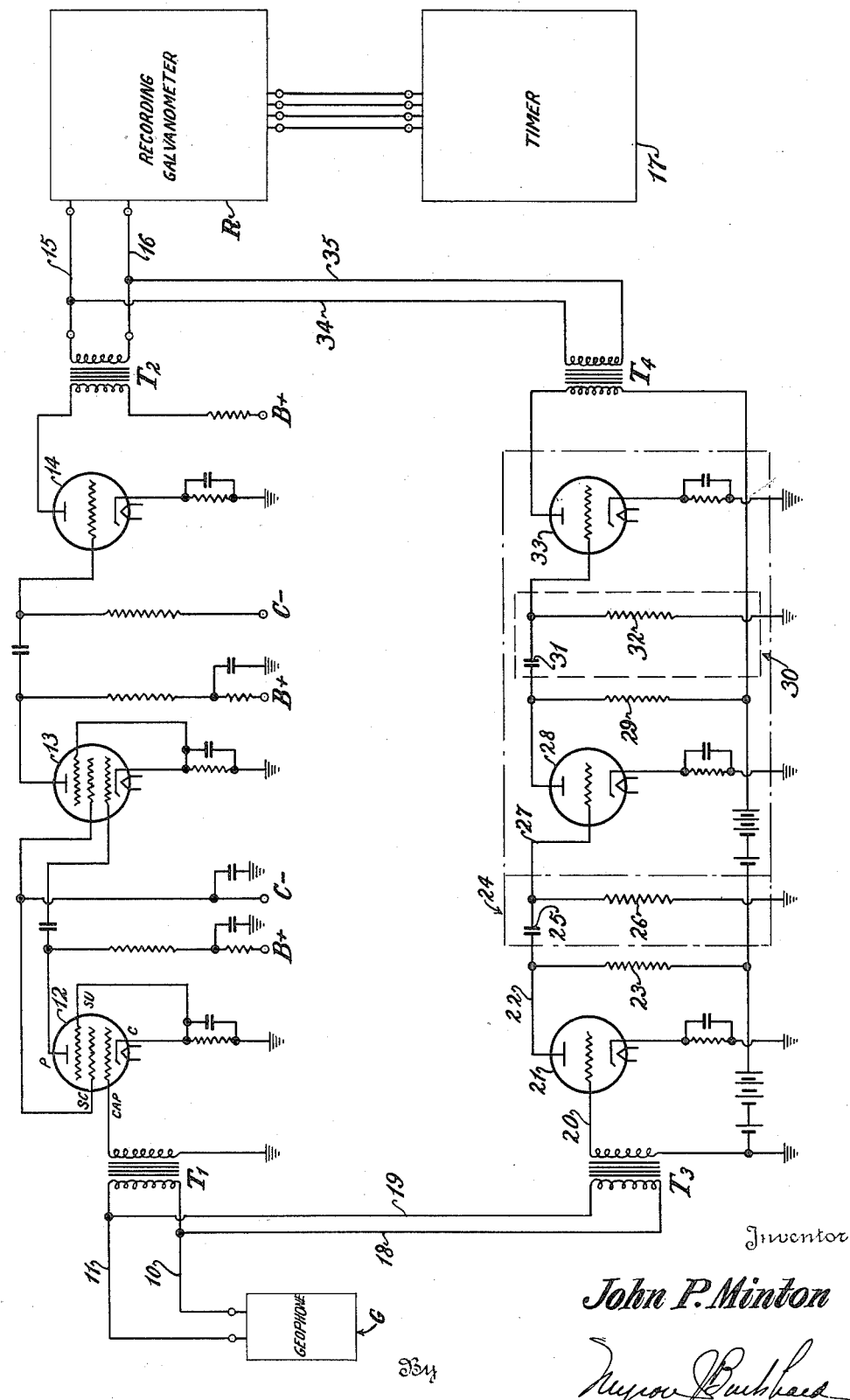

Patented Dec. 8, 1942

2,304,740

UNITED STATES PATENT OFFICE 2,304,740

METHOD FOR RECORDING SEISMIC WAVES

John P. Minton, Dallas, Tex., assignor, by mesne assignments, to Socony-Vacuum Oil Company, Incorporated, New York, N. Y., a corporation of New York Application March 6, 1940, Serial No. 322,503

1 Claim. (Cl. 177—352)

This invention relates to a method and apparatus for recording seismic waves and more particularly to a method for lending improved character to recorded signals which have been generated in sympathy with seismic waves.

Although the prior art discloses numerous methods for recording reflected seismic waves, none of the methods have been directed to changing the character of the reflections. After seismic waves have traveled through a succession of subsurface strata, due to distortion and absorption they lose character in that an observer is unable to distinguish from the record of these waves the exact instant at which the first energy in a particular reflection, arrives at the detecting instrument. This is primarily because the amplitude of the reflection is very slow in reaching its maximum. Therefore, in order to be able to distinguish the instant of arrival of the first energy in a particular reflection it is necessary that some means be provided for building up the wave front of the initial portion of the reflection and still retain the characteristics of the reflection wave form by which it has been distinguished heretofore.

The subject matter of the present application is the provision of a method and means for accomplishing the result recited above. In addition to detecting the seismic waves, amplifying them and recording them in the conventional manner, means are provided whereby derivatives of the wave passing through the conventional amplifier can be taken electrically and combined with the function. The resultant signals will not only have, when recorded, the conventional energy envelope but will have in addition thereto an initial portion of abrupt wave front that will enable the observer not only to distinguish the reflections on the record but to determine instantly the exact time of arrival of the first energy in the reflected wave.

Therefore it is the primary object of the present invention to provide a method and means for lending improved character to reflected waves when recorded on the seismogram by building up the initial portion of the reflection.

Another object of the invention is the provision of a method of recording seismic waves after the wave signals have been amplified in the conventional manner and combined with a selected order of derivative of the electrical signals.

Still another object of this invention is the provision of one or more derivating amplifiers that may be connected in parallel with a conventional amplifier to produce a composite signal that may be recorded as the function of a reflected wave plus one or more of its derivatives of selected order.

This invention further contemplates a method and apparatus for recording all of the detected energy from a single reflected wave at substantially constant amplitude.

Other objects and advantages will become apparent from the following detailed description when viewed in the light of the drawings, in which:

Figure 1 is a diagrammatic illustration of the reflection seismograph operation showing the shot point, two geophones, amplifiers and recording galvanometer;

Figure 2 is a group of curves illustrating a reflected wave, the same wave after having 1, 2 and 3 derivatives taken of it, and the combination of the reflected waves and the derivatives;

Figure 3 is a detail circuit diagram of a conventional amplifier connected in parallel with a derivating amplifier;

Figure 4 is a diagrammatic illustration of an arrangement of amplifiers and derivating stages showing an arrangement whereby the wave function and a selected order of derivatives can be combined to give a resultant wave which can be recorded on the recording galvanometer; and Figure 5 is a modification of the arrangement shown in Figure 4.

Referring to the drawings in detail, particularly Figure 1, there is illustrated a section of the earth's surface showing the different strata which form interfaces from which seismic waves are reflected. Seismic waves are created at the shot point S by the detonation of an explosive charge. These waves travel outwardly from the shot in all directions and comprise a complex wave train of many frequencies. Some travel directly through the surface of the earth to the geophones $G_1$ and $G_2$ along the path $a$. Others travel downwardly and strike a more dense strata along which they are refracted and finally reach the geophones where they are detected, while others, those in which we are primarily interested, travel downwardly from the shot point to the interfaces of the substrata from which they are reflected along the paths $b$ to the geophones where they are detected.

The geophones that are used for the detection of these seismic waves can be of any conventional type but preferably of the type which will generate an electrical signal that will correspond in frequency and amplitude to the seismic waves striking the geophone. These generated electrical signals are conducted to amplifiers where they are amplified and recorded on a plurality of traces by a recording galvanometer of conventional design.

As illustrated by the curve $f(x)$ in Figure 2, the first energy in a particular reflection is quite weak and as a result in many cases it is impossible to tell from the trace just when the first energy of the reflection reached the geophone.

None of the apparatuses known to date for recording seismic waves provide means for emphasizing this first part of the reflection. Since, in interpreting seismograms, an attempt is made to read the instant of arrival of a reflection to $\frac{1}{1000}$ seconds, it becomes quite important that the first energy to reach the geophone should be sufficiently emphasized by the apparatus that a definite break will occur in the trace when recorded. This problem has been solved by the present invention by detecting and amplifying the reflection in the usual way but in addition, taking a selected number of derivatives of the wave to emphasize the build up time and adding these derivatives back to the function, and then recording the composite results of the function and the derivatives. The result will be as shown in Figure 2, a reflection which still retains its distinguishing features but having a wave front that is sufficiently abrupt that an interpreter can readily distinguish the instant at which the first energy was detected by the geophone.

In Figure 2 $f'(x)$, $f''(x)$ and $f'''(x)$ illustrate first, second and third order of derivatives of the function $f(x)$. When these derivatives are combined with the function, the result will be as shown at $$f(x) + \sum_{n=1}^{n=n} f^n(x)$$

in the bottom of the figure. As shown by these curves, taking the derivative of the function produces attenuation to such a degree that the distinguishing feature of the function is not disturbed when these derivatives are added to it.

In Figure 3 there is shown a detailed circuit diagram by means of which detected seismic waves may be amplified and recorded in the manner taught by this application. The seismic waves are detected by the geophone G and the electric signals that are generated in the geophone that correspond to the seismic waves are conducted by the conductors 10 and 11 to the primary of a transformer T₁. The transformer T₁ is the input transformer of a conventional resistance coupled amplifier which utilizes pentode tubes 12 and 13 in the first two stages and a triode 14 in the last stage. The output transformer T₂ of this amplifier is connected in the input circuit of a recording galvanometer R by means of the conductors 15 and 16.

There is shown associated with the recording galvanometer conventional timing means 17 that are adapted to cooperate with the recording galvanometer in marking definite indications of the passage of time on the seismogram while recording the seismic waves.

If the amplifier described above was used alone for amplifying the seismic waves, the record obtained would be conventional in form. That is, all reflections would be very weak at first, making it very hard or almost impossible to distinguish when the first energy arrived at the detecting instrument. To overcome this objectionable feature, a derivating amplifier is connected in parallel with the amplifier described above. Conductors 18 and 19 place the primaries of the input transformers T₁ and T₃ in parallel relationship. Therefore, the same signals that are introduced to the first amplifier will be introduced to the second or derivating amplifier.

The signals from the secondary of the transformer T₃ are impressed on the grid circuit 20 of an amplifier tube 21. The output signals from the tube 21, appearing in the plate circuit 22 and resistor 23 produce signal voltages across the resistor, in a manner well-known to those familiar with resistance coupled amplifiers, that can be impressed across the derivator 24 that comprises the condenser 25 and resistance 26 connected in series. If the impedance of the condenser 25 is made quite high relative to that of the resistor 26, then a voltage can be tapped off of the resistor 26 by the conductor 27 and the ground circuit that will be substantially the first derivative of the voltage occurring across the resistance 23.

Due to the high attenuation effected by derivating, it is often necessary to interpose amplification stages between derivative taking stages. Therefore, the voltage across the resistance 26 which is substantially the first derivative of the voltage appearing across the resistance 23, is introduced in the grid circuit of amplifier tube 28 where it is amplified in a manner well-known in the art. The voltage appearing across the resistor 29 as a result of the flow of current in the plate circuit of tube 28 is again derivated by means of the second derivative taking stage 30 which comprises the condenser 31 and the resistance 32. The resultant voltage across the resistor 32 will now be substantially a derivative of a derivative or the second derivative of the input voltage to the amplifier. The voltage corresponding to the second derivative may then be impressed on the grid circuit of a third amplifier tube 33 where it is further amplified and conducted to the recording galvanometer by means of the transformer T₄, the conductors 34, 35, 15 and 16.

Since the primary windings of transformers T₁ and T₃ and the secondary windings of transformers T₂ and T₄ are connected in parallel, the two amplifiers will function in parallel to produce a composite record that will be made up of a wave function plus the second derivative of the function. The resulting recorded reflection in the trace will have the distinguishing features by which it has been recognized heretofore and in addition, will have its first weak energy portion emphasized sufficiently that the interpreter of the record can instantly select the exact instant at which the first energy of the reflection reached the geophone.

There are numerous ways in which the derivating amplifier channels can be connected with the conventional amplifier channel to give results having the desired characteristics. Another arrangement is illustrated in Figure 4. In this arrangement, the input terminals of the conventional amplifier 36 are connected in parallel with the input terminals of derivating amplifiers 37, 38 and 39 by means of the conductors 40 and 41. The output signals from these amplifiers are respectively impressed across the resistances 42, 43, 44 and 45. These resistances are all connected in series and in the input circuit of the recording galvanometer R by leads 46 and 47. Amplifier 36 will amplify the signal voltage waves generated by the geophone without distortion. Amplifier 37 will take the first derivative of the signal voltage from the geophone, amplifier 38 the second derivative and amplifier 39 the nth derivative. By means of switches 48, anyone or any combination of the derivative taking amplifiers can be connected or disconnected from the circuit in such a manner that the operator can record the function wave alone, or the function wave plus any order of derivative which he may desire. Each of the amplifiers 37, 38 and 39, in addition to having derivative taking stages such as described in connection with Figure 3 may be provided with any desired number of amplification stages. This particular arrangement has sufficient flexibility that any combination of amplifiers can be selected by the operator by the mere manipulation of the switches 48.

Still another arrangement of the apparatus is illustrated diagrammatically in Figure 5. Waves which are detected by the geophone G are first amplified in the conventional manner by the amplifier 49. The amplified signals from the output of the amplifier are impressed across the resistance 50 by means of leads 51 and 52 and the input of derivating amplifier 53. The output signals from the derivating amplifier 53 are impressed across the resistor 54 by means of the leads 55 and 56 and the input to amplifier 57. The output signal from amplifier 53 will be the first derivative of the voltage impressed across the resistance 50. The output from derivating amplifier 57 is impressed across the resistance 58 by means of leads 59 and 60 and across the input to derivating amplifier 61. The output signal voltage from the derivating amplifier 57 will therefore be a derivative of a derivative or a second derivative of the amplified function that is impressed across the resistance 50. The output of the amplifier 61 is connected across the resistor 62 by means of the leads 63 and 64 and across the input of another derivating amplifier 65. The signal across the resistor 62 will be substantially the third derivative of the function. The signal voltage output from the derivating amplifier 65 is impressed across the resistor 66 by means of the leads 67 and 68. The resistances 50, 54, 58, 62 and 66 are all connected in series and by means of the leads 69 and 70 connected in the input circuit of the recording galvanometer, in such a manner that the voltages across these resistances will add to produce a record of the waves having the desired characteristics. By means of switches 71, like the arrangement disclosed in Figure 4, any combination of the amplifiers can be used to produce a record having the desired characteristics.

Although the subject matter of this invention has been described in connection with a single geophone, it is obvious to those skilled in the art that it is applicable to an electric seismograph that employs a plurality of geophones, amplifiers and traces.

The detailed circuits of the various elements used in the process and apparatus above have not been specifically described inasmuch as they are commonly known and may be varied within relatively wide ranges without departing from the principles of this invention.

I claim:

A method of recording reflected seismic waves that comprises the steps of detecting the seismic waves by generating corresponding electrical signals, amplifying a portion of the generated signals directly, taking a selected order of derivatives of at least one other portion of the generated signals, adding the derivatives singly or in combination to the amplified first portion such that the resultant signals will be at least in part in phase with the portion of the directly amplified signals and recording the sum on a single trace.

JOHN P. MINTON.